Patented Oct. 18, 1927.

1,646,157

UNITED STATES PATENT OFFICE.

HERBERT T. LEO, OF TOPEKA, KANSAS.

DRY-POWDERED JELLY BASE CONTAINING PECTIN AND SUGAR AND PROCESS OF MAKING SAME.

No Drawing.  Application filed March 14, 1922.  Serial No. 543,792.

This invention relates to a jelly base in dry powdered form containing pectin and sugar and to a process of making the same.

An object of the invention is to provide a convenient and quick method for making jelly and to eliminate any guesswork in the use of powdered pectinous substances.

Another object resides in the provision of means whereby the waste of time and material in the present method of making jelly from pectin or pectinous substances is eliminated.

Pectin or pectinous substances, which form the base of all fruit jellies, may be sold as powder. In this form the base has many advantages over a liquid solution of it. In the powdered form it may be substantially ninety-five per cent. pure, does not spoil on contact with the air, and is very convenient to handle. The liquid generally on the market contains approximately from five to seven per cent of pectin, is perishable when opened, and inconvenient to handle.

The powdered preparations offered generally contain pectin or pectinous substances and acid alone. Pectin is by nature a gum, and when wetted on the outer surface it requires much agitation to get it into solution. However, when powdered or granular, and added to water, or when water is added to it, it immediately forms into hard, difficultly soluble lumps which take much unnecessary agitation to get into solution. This inherent property of pectin or pectinous substances has always been the bugbear of manufacturers.

In order to avoid this difficulty, I have, after considerable experimentation, discovered that if the pectin in the powdered form is mixed with a fine powdered or granulated substance which acts as a dispersing phase for the pectin or the pectinous substances, there will be no lumping or solidifying or hardening when brought into contact with water and the pectin will go into solution in the proper manner almost at once. Therefore, by pulverizing the pectin or pectinous substance and adding to it any finely powdered material in excess of the pectin by weight, the pectin will go rapidly into solution. This, however, was only true when the dispersing material went into solution, or into solution more readily than the pectin or pectinous substance itself. After experimenting I found that the dispersing substance or medium which would give the proper rate of entering the solution to the pectinous substance was a finely granulated or powdered sugar. This was particularly advantageous since sugar enters into the final product, which is a jelly or a jam. It is, of course, understood that other ingredients may be used as the dispersing medium, such substances being cerelose, salt, or any other powdered substance which is soluble in water and not injurious to the pectin or to the jelly.

I have further found that the ratio of the finely powdered or granulated sugar to the pectin should not fall below a 1 to 1 ratio and should not exceed a 50 to 1 ratio. These ratios were recognized as limits because above a 50 to 1 ratio it was found impossible to dissolve the pectin in the presence of sugar or sugar and acid; and that when the ratio was below a 1 to 1 ratio the sugar would not disperse the pectin sufficiently to overcome the lumping tendency.

It may also be desirable to add an acid to the powder mixture, especially if it is to be sold substantially ready for making jelly. This acid may be any desired acid, preferably a fruit acid. Acids which can be used may include malic acid, citric acid or tartaric acid. In the event that acid is added to the powdered mixture, the ratio of the pectinous substance to the acid varies from 2 to 1 to 4 to 1.

In accordance with the purpose of making pectin, set forth in my copending application, Serial No. 464,752, filed April 26, 1921, entitled "A dry powder jelly base containing pectin," I have discovered that although a greatly improved and much purified pectin is obtained, and although the maximum amount of pectinous substances in the fruit is transformed into pectins and calcium pectate, nevertheless, with given quantities of this pectin obtained from day to day, the capacity of this given amount to jellify with sugar varies. Therefore, in one batch of pectin produced, a pound of it may jellify 75 pounds of sugar; whereas on another day the same quantity of pectin produced may jellify with 80 lbs. of sugar; and this variation may take place over reasonably wide limits. In order, therefore, to put this composition on the market so that the housewise need only be concerned with the addition to the package sold of a definite amount of sugar in a proper liquid, I have to determine by a suitable experiment the capacity of each batch of pectin with respect to sugar and then add a sufficient amount of sugar in the package so that the balance of sugar to be added by the housewife from day to day as she buys this product is fixed. On the other hand, the addition of sugar to the powdered pectin in the package enables the pectin to go immediately into solution, an operation which is not possible by adding pectin in water by itself.

What I claim is:

1. A jelly base which comprises a powdered pectin and a sugar, the quantity of a finely divided sugar present varying from an amount equal to the pectin to fifty times the amount of pectin substance.

2. A jelly base which comprises a dry powdered mixture of pectin, acid, and a finely divided sugar, the ratio of sugar to pectin varying between one to one and fifty to one, and the ratio of acid to pectin varying from one to two to one to four.

3. A jelly base which includes a definite amount of powdered pectin the capacity of which to jellify a definite amount of sugar in the presence of an acid may vary but is determinable, and an amount of a finely divided sugar added thereto to act as an agent to facilitate the rapid solution of the pectin in water, the amount of sugar varying inversely as the above-mentioned capacity of the pectin with respect to sugar changes, whereby the housewife in making jelly need only be concerned with the addition to this composition in liquid of a predetermined amount of sugar.

4. A jelly base which comprises a powdered pectin and finely divided sugar, the quantity of sugar in the composition varying in accordance with the variation in the jellifying capacity of the pectin, the amount of said sugar also being determined in accordance with its ability to effect the solution of the pectin in the liquid into which the composition is placed.

HERBERT T. LEO.

definite amount of sugar in a proper liquid, I have to determine by a suitable experiment the capacity of each batch of pectin with respect to sugar and then add a sufficient amount of sugar in the package so that the balance of sugar to be added by the housewife from day to day as she buys this product is fixed. On the other hand, the addition of sugar to the powdered pectin in the package enables the pectin to go immediately into solution, an operation which is not possible by adding pectin in water by itself.

What I claim is:

1. A jelly base which comprises a powdered pectin and a sugar, the quantity of a finely divided sugar present varying from an amount equal to the pectin to fifty times the amount of pectin substance.

2. A jelly base which comprises a dry powdered mixture of pectin, acid and a finely divided sugar, the ratio of sugar to pectin varying between one to one and fifty to one, and the ratio of acid to pectin varying from one to two to one to four.

3. A jelly base which includes a definite amount of powdered pectin the capacity of which to jellify a definite amount of sugar in the presence of an acid may vary but is determinable, and an amount of a finely divided sugar added thereto to act as an agent to facilitate the rapid solution of the pectin in water, the amount of sugar varying inversely as the above-mentioned capacity of the pectin with respect to sugar changes, whereby the housewife in making jelly need only be concerned with the addition to this composition in liquid of a predetermined amount of sugar.

4. A jelly base which comprises a powdered pectin and finely divided sugar, the quantity of sugar in the composition varying in accordance with the variation in the jellifying capacity of the pectin, the amount of said sugar also being determined in accordance with its ability to effect the solution of the pectin in the liquid into which the composition is placed.

HERBERT T. LEO.

DISCLAIMER 1,646,157.—*Herbert T. Leo*, Topeka, Kans. DRY-POWDERED JELLY BASE CONTAINING PECTIN AND SUGAR AND PROCESS OF MAKING SAME. Patent dated October 18, 1927. Disclaimer filed April 9, 1936, by *Herbert T. Leo, Stanton W. Forsman*, and the assignee, *Kwik-Set, Inc.*

Hereby enter this, their disclaimer, in respect to claims 3 and 4 of said Letters Patent.

[*Official Gazette May 5, 1936.*]

DISCLAIMER 1,646,157.—*Herbert T. Leo*, Topeka, Kans. DRY-POWDERED JELLY BASE CONTAINING PECTIN AND SUGAR AND PROCESS OF MAKING SAME. Patent dated October 18, 1927. Disclaimer filed April 9, 1936, by *Herbert T. Leo, Stanton W. Forsman*, and the assignee, *Kwik-Set, Inc.*

Hereby enter this, their disclaimer, in respect to claims 3 and 4 of said Letters Patent.

[*Official Gazette May 5, 1936.*]